May 4, 1954   J. D. BALDWIN, JR   2,677,345
DIP TUBE WITH DEFLECTOR
Filed Oct. 9, 1951
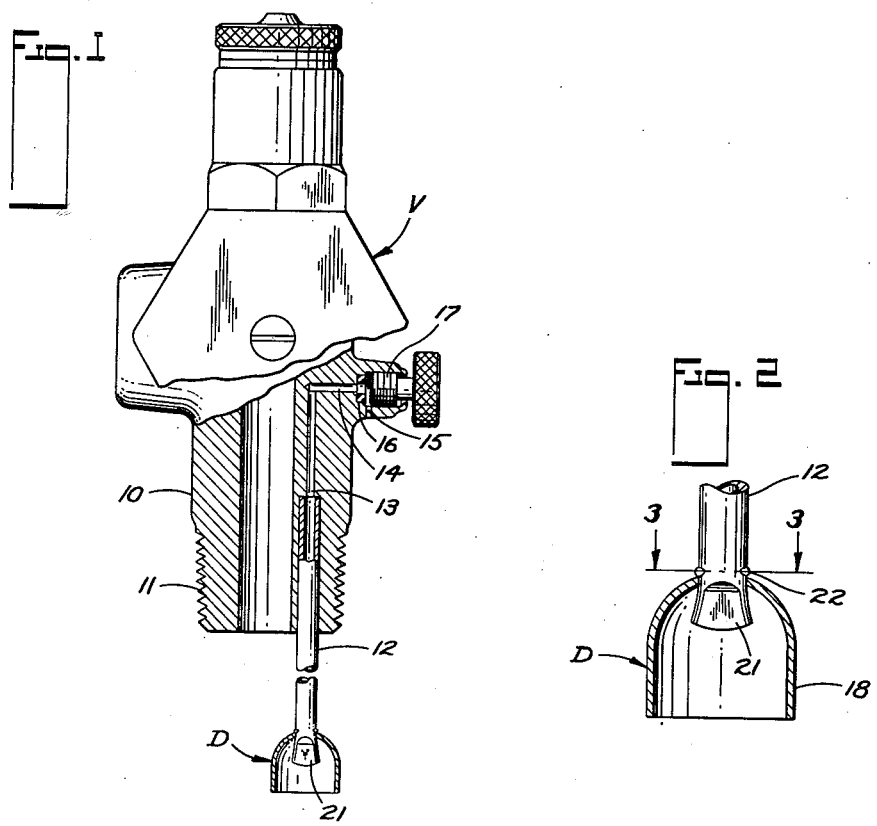
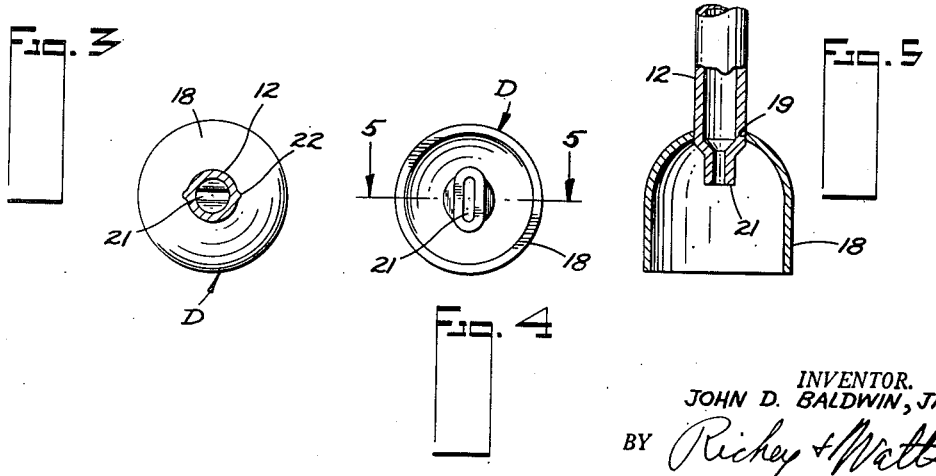
INVENTOR.
JOHN D. BALDWIN, JR.
BY *Richey & Watts*
ATTORNEYS Patented May 4, 1954

2,677,345

UNITED STATES PATENT OFFICE 2,677,345

DIP TUBE WITH DEFLECTOR

John D. Baldwin, Jr., Highland Heights, Ohio, assignor to The Weatherhead Company, Cleveland, Ohio, a corporation of Ohio Application October 9, 1951, Serial No. 250,491

2 Claims. (Cl. 116—118)

This invention relates to the dispensing of liquefied petroleum gas and more particularly to liquid level gauge tubes for installation in such dispensing systems.

The liquefied petroleum gas is stored in pressure vessels which must be filled from time to time. It is necessary that the vessels be not completely filled with liquid in order to ascertain the liquid level and determine the desired degree of filling of the vessel. A gauge tube is inserted into the vessel the end of which is disposed at the desired liquid level. When the liquid reaches the end of the gauge tube, the vapor pressure above the liquid level causes liquid to flow out of the tube through a valve, thereby giving an indication that the vessel has been filled to the desired level. Difficulty has been encountered in such installations in that stray drops of liquid may find their way into the tube and give a false indication that the vessel is filled. This difficulty is removed by providing a splash and drip shield at the mouth of the tube as described in Patent No. 2,540,699, assigned to The Weatherhead Company.

The principal object of the invention resides in precluding a false indication that the vessel is filled by means of a gauge tube that is economically and readily manufactured. This is accomplished in a preferred embodiment of the invention by pinching the end of the tube so as to provide a capillary opening therein and slipping a sheet metal deflecting skirt over the tube which prevents splashing of liquid against the end of the tube and serves as a drip ledge during the filling operation.

Other objects and advantages of the invention will be apparent from the following detailed description of the preferred embodiment of my invention.

In the drawings:

Fig. 1 shows a typical valve embodying the gauge tube of the invention;

Fig. 2 is a section through the splash shield;

Fig. 3 is a section taken on 3—3 of Fig. 2;

Fig. 4 is a bottom view of the gauge tube; and,

Fig. 5 is a section taken on 5—5 of Fig. 4.

The valve V is a filling and dispensing valve of a type well known in the art that is mounted in a vessel for storing liquefied petroleum gas. The valve includes a nipple 10 threaded as at 11 for mounting in the tank. It has fastened therein a gauge tube 12 that communicates through a bore 13 formed in the valve body. A cross bore 14 communicates to a bleed port 15 through a perforated sealing washer 16 confined in a threaded nipple mounting a threaded closure plug 17. The deflector D is mounted at the lower end of the guage tube which end is disposed at the desired liquid level. The deflector D is in the form of a cup-like sheet metal member having a skirt portion 18 and a bore 19 that passes over the tube 12. The end of the tube is pinched or flattened as at 21 to provide a narrow capillary opening. For example, if the tube is approximately ⅜" outside diameter, I prefer to deform the end thereof so that the width of the capillary entry slot is about .010" to .015". The tube of this type will readily pass vapor and will also pass liquid when submerged with a vapor pressure existing about the level of the liquid. However, stray drops that may not be deflected by the skirt 18 or that may splash back in through the skirt will not pass through the entrance mouth of the tube 12 but rather will be vaporized by contact of the gas rushing through the slotted mouth of the tube. In order to retain the deflector member D on the tube, the tube is pinched or deformed as at 22 to form projections or lugs that prevent the deflector from rising up along the tube. Motion of the deflector in the other direction is prevented by the flattening of the tube at 21, the result being that the deflector is quickly and firmly held in place without requiring soldering or brazing operations and without requiring a threading operation.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. For use in a container of liquefied gas to determine the level of said liquid in said container a dip tube comprising a tubular body terminating at its lower end in a narrow capillary entrance mouth, and a skirt-like deflector member connected at its upper end to said body and having a gas inlet mouth of substantially greater area than the inlet of said tube, said capillary entrance mouth positioned in said container at the desired level of said liquefied gas therein, said capillary mouth and deflector preventing false readings of liquid level due to splashing of said liquefied gas.

2. For use in a container of liquid to determine the level of said liquid in said container a dip tube comprising a tubular body terminating at its lower end in a narrow capillary entrance mouth, and a skirt-like deflector member connected at its upper end to said body and having a gas inlet mouth of substantially greater area than the inlet of said tube, said capillary entrance mouth positioned in said container at the desired level of said liquid therein, said capillary mouth and deflector preventing false readings of liquid level due to splashing of said liquid.

References Cited in the file of this patent

UNITED STATES PATENTS

| Number | Name | Date |
|---|---|---|
| 2,479,737 | Garretson et al. | Aug. 23, 1949 |